United States Patent [19]
Brooks et al.

[11] Patent Number: 5,824,898
[45] Date of Patent: Oct. 20, 1998

[54] ROTATING MASS BALANCING SYSTEM

[75] Inventors: Peter E. Brooks; Lance A. Gabrielson, both of Rochester, Minn.

[73] Assignee: Western Digital Corporation, Irvine, Calif.

[21] Appl. No.: 673,370

[22] Filed: Jun. 28, 1996

[51] Int. Cl.⁶ .................................................. G01M 1/16
[52] U.S. Cl. .......................................... 73/469; 360/98.06
[58] Field of Search ............................. 73/469, 471, 472, 73/473, 474, 475, 476, 477, 478, 479, 487, 461; 360/98.08, 99.05, 99.12, 99.09

[56] References Cited

U.S. PATENT DOCUMENTS

| | | | |
|---|---|---|---|
| 3,854,347 | 12/1974 | Hellerich | 360/98.08 |
| 4,561,035 | 12/1985 | McDorman et al. | 360/137 |
| 4,683,505 | 7/1987 | Schmidt et al. | 360/98 |
| 4,933,927 | 6/1990 | Ross | 369/270 |
| 4,949,579 | 8/1990 | Nayar | 73/468 |
| 5,422,776 | 6/1995 | Thorson et al. | 360/98.07 |

*Primary Examiner*—Christine K. Oda
*Attorney, Agent, or Firm*—Leo J. Young, Esq.; W. Chris Kim, Esq.

[57] ABSTRACT

A system for balancing devices having motors and rotating masses to be coupled to the motors utilizes a momentum transfer mechanism to shift the rotating mass based on sensed imbalance. In this manner the mass is shifted to a position which accounts for the inherent imbalance in both the motor and the mass. A controller receives imbalance information from a velocity sensor and controls a solenoid to strike a base coupled to the motor to shift a lightly clamped mass relative to the motor. In one embodiment, a disk drive has disks initially biased by the system against a hub, and then shifted during rotation to create a disk drive having concentrically aligned disks offsetting imbalance inherent in a motor used to rotate the disks. In one embodiment, the disks are held to the hub by a clamp having screws. The screws are driven simultaneously through the same angle of rotation to ensure that the axial clamping force of each one is substantially equal. In a further embodiment, the screws are formed of a heat shrink material, and shrunk following initial light tightening to provide consistent axial clamping force.

8 Claims, 7 Drawing Sheets

ROTATING MASS BALANCING SYSTEM

FIELD OF THE INVENTION

The present invention relates to balancing rotating objects, and in particular to balancing rotating objects by shifting them.

BACKGROUND OF THE INVENTION

Hard disk drive storage devices have been used as a secondary storage device for computer systems for many years. They provide inexpensive, high capacity digital storage with the ability to quickly access data stored on the drive. A typical hard disk drive comprises a housing with one or more magnetic disks separated by spacers mounted on a motor driven spindle hub which in turn is supported on a base. Data is stored on the disks by changing the magnetization of small areas on the disks called domains. The domains are written and read by magnetic transducers mounted on the end of suspensions which are coupled to a rotary actuator positioned to one side of the disks. The rotary actuator moves the transducers radially over the surfaces of the disks. Data on the disks are written in substantially parallel concentric tracks, with information, called servo information designed to be detected by the transducers and used to control the radial position of the transducer so that it can move across tracks of data and follow a track of data.

It is crucial that the mass of the disks and spacers be balanced on the spindle hub so that they do not cause significant vibration of the disk drive when rotated at high speed. Typical disks rotate at between 6,000 to 8,000 revolutions per minute (RPM) and higher. An out of balance condition in the rotating disk assembly causes erratic speed variations with respect to the tracks and heads which results in read/write errors. Planar and axial vibrations of the disk surfaces can also contribute to head crashes, harming both the disk surface and the head. Disks which significantly vibrate when rotating also increase track misregistration, cause annoying acoustical emissions (noise) and a reduction in the life of spindle bearings. When such disk drives are used in an array of disk drives, the mechanical vibrations of the multiple drives can synchronized, resulting in unacceptable vibration of the array. There is a need to ensure that the disks are centered and balanced when clamping them to the spindle hub to avoid these problems.

There have been several attempts to accurately center and or balance the disks to minimize rotational vibrations. In addition to designing and manufacturing disks and hubs to tight tolerances, there were many attempts to balance disk stacks and hubs by adding or removing material, as well as using mechanisms to shift one or more elements in the stack to alternate nominal positions as in U.S. Pat. No. 4,683,505 to Schmidt et al. U.S. Pat. No. 5,422,776 to Thorson et al. measures the imbalance of a disk stack and hub at operational speed. Plugs of varying weights are then inserted into free screw holes at the top of the hub to minimize the imbalance. This method takes a significant amount of operator time and intervention. It can take several different plugs of varying weight established by iterative spinning and stopping of the disk stack. Each screw also has the potential to generate particles which can damage the head.

U.S. Pat. No. 4,933,927 to Ross uses a contact element applied to the disks outer diameter which is slowly moved away from the disks as they begin to rotate. This method, as in the '505 patent attempts to balance the disk stack by modifying the position of the elements about the hub to nominal positions. A method of balancing the disk pack is needed which does not require the addition or subtraction of mass from the disk pack, and which takes into account the actual mass imbalance of the combination of disk stack and hub. Such a method must be repeatable from drive to drive during a simple manufacturing process with minimal operator intervention.

SUMMARY OF THE INVENTION

The amplitude of rotational vibration of a rotating mass is reduced by imparting acceleration to a support of the rotating mass to shift it as a function of measured rotational vibration. In one embodiment, a disk stack in a disk drive is the rotating mass. It is rotated by a spindle motor. The spindle motor is mounted in a base of the disk drive, and is rotatingly coupled to a hub. The disk stack is then loosely coupled to the hub. The motor rotates the hub and disk stack, and a sensor detects vibrations of the base caused by imbalance. A momentum transferring force is then applied to the base to cause the disk stack to shift relative to the base in a manner designed to reduce the imbalance and hence the vibrations. Multiple instances of momentum imparting force are applied until the vibrations are within a predetermined value. The disk pack is then fixedly coupled to the hub.

In one embodiment of the invention, a disk pack is placed over the hub and loosely coupled thereto by a clamp. The clamp is tightened just enough to permit movement of the disk stack with sufficient momentum imparting force applied to the base. The base is placed in a flexible deck adjacent a solenoid hammer. A unidirectional displacement transducer is mounted to the flexible deck to measure vibration causing displacement about a single axis of vibration. Based on feedback from the sensor while the disk stack is rotated, the solenoid hammer is used to strike the base with sufficient momentum transferring force to shift the entire disk stack relative to the hub and to bias the inner diameter or each element of the stack against one side of the hub. This causes registration of all disks and spacers of the stack based on the inner diameter of each disk and spacer in the stack so that their center openings are substantially concentric. Following registration the base is repeatably struck as a function of measured vibration and rotational delay to shift the stack into a position which minimizes rotational vibration. The clamp is then tightened to prevent further shifting of the stack.

The solenoid hammer is supported by a large mass to ensure that it does not move significantly and can deliver consistent impacts to the base of the disk drive. One end of a pair of leaf springs are coupled to the sides of this mass, and extend in the same direction as the movement of the hammer. The other ends of the leaf springs are coupled to a flex deck, which contains vacuum activated suction cups and an opening to substantially conform to and hold the bottom of the disk drive base which contains a motor and hub assembly. The sensor is affixed to the flex deck at a right angle to the leaf springs to generate a signal representative of the imbalance vector. A hinged cover plate supported adjacent the flex deck is used to cover the disks during striking and to provide a guide and support for a stabilizer to stiffen the motor while permitting sufficient movement for disk stack shifting.

By shifting the entire disk stack in unison, and based on vibration of the entire drive, a unique structure results. The disks are all substantially concentrically aligned relative to each other in a desired manner following the balancing. In addition, the inherent vibration causing rotational imbalance in the motor and hub combination are offset by a substantially equal and opposite imbalance in the disk stack without the addition or subtraction of any mass from the stack to provide a much better balance and minimization of vibration over prior methods. With imbalance reduced by as much as a factor of 5 for larger disk drives, acoustical noise has also been greatly reduced.

A further benefit of the invention is that the resulting disk stack has improved concentricity relative to the axis of rotation. There is a substantially uniform clearance between the outside diameter of the spindle motor hub and the inside diameters of the disks and spacers. This ensures that the center of no disk is in contact with the hub, eliminating direct thermal conduction between the disks and hub caused by either a disk contacting the hub, or from an elastomer spacer used in some prior art disk drives. It also provides great benefit relative to thermal disk shift, is quick and cost effective since no additional materials or repetitive spin up of drives is required.

DESCRIPTION OF THE EMBODIMENTS

Figure 1:
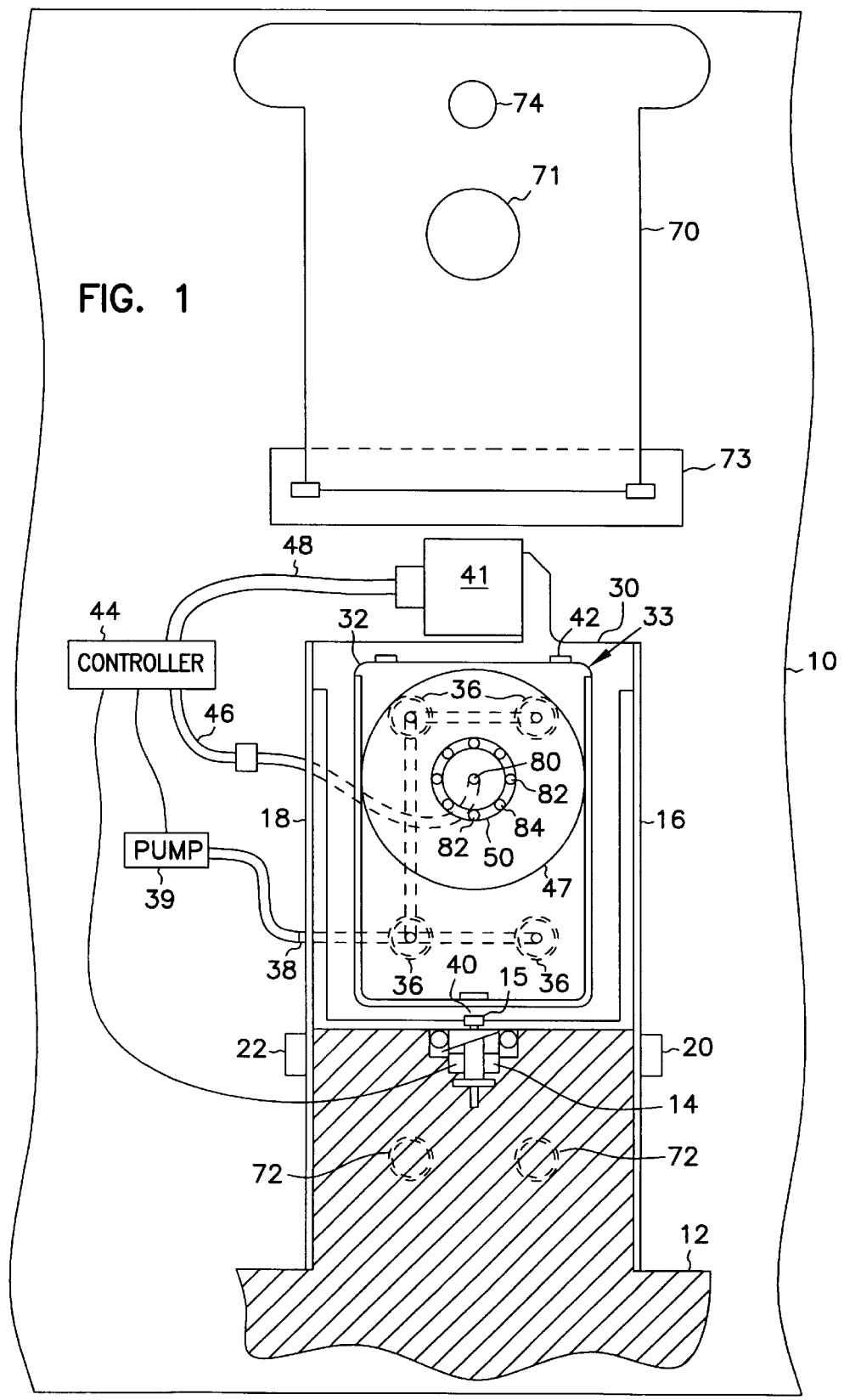
FIG. 1 is a top view of a fixture used for centering a disk stack on a disk drive.

A fixture for balancing a rotating mass such as a stack of disks and spacers is indicated generally at 10 in FIG. 1. The fixture 10 comprises a block 12 supporting a solenoid 14 which drives a hammer 15 with a controlled momentum transferring force. A pair of leaf springs 16 and 18 are supported by the block 12 at first ends via clamps 20 and 22. The leaf springs 16 and 18 extend away from block 12 in the direction of motion of the hammer 15, and are coupled to a flex deck 30 at their second ends. The leaf springs permit free movement of the flex deck in substantially a single dimension. Other arrangements which allow measurement of movement or forces caused by a rotating mass will be apparent to those skilled in the art. One further example includes the use of a rigid mount with force sensors on the mounts to measure the forces exerted on them by the rotating mass. Such forces may be processed to determine magnitude and phase of such forces in relation to the rotating mass.

The flex deck 30 is constructed of a low mass material such as plastic (acetal), metal or wood. Its mass is small compared to the mass of the block 12 to allow it to move freely along a single axis as defined by the leaf springs. The axis of movement is perpendicular to the direction of motion of the hammer.

The flex deck 30 comprises a plate formed with a depression corresponding to a base casting 32 of a disk drive 33. The flex deck has a plurality of suction cups 36 placed or distributed thereon and aligned with suitable portions such as flat areas of the base to secure the base casting during operation. A vacuum port 38 is coupled to a pump 39 and corresponding tubing is integrated into the flex deck 30 to provide a suction of about minus 14 PSI to secure the base casting 32. Alternative methods of clamping the casting 32 to the deck, such as standard mechanical clamps will be apparent to those skilled in the art.

A front elastomer datum 40 is provided in the depression of the flex deck to space the base casting 32 an appropriate fixed distance from the solenoid 14 and hammer 15 which travels a consistent distance when activated prior to striking the base casting 32. Note that the leaf springs allow movement of the flex deck 30 and hence base casting 32 in a direction perpendicular to the movement of the hammer such that the base casting distance to the hammer is fairly constant and fixed. The depression and datum 40 are formed so that the hammer 15 will strike the base casting 32 in a desired position, preferably approximately through its center of mass. At least one elastomer biasing pad 42 is provided on the opposite side of the depression to ensure that the base casting 32 is properly registered with the datum 40. Note that other methods of imparting momentum transferring force on the base casting, such as an actuator delivering a measured and controllable momentum transferring force under program control or a piezoelectric device under computer control will be apparent to those skilled in the art.

A unidirectional displacement transducer 41 such as an accelerometer is mounted to the flexible deck to measure vibration causing displacement about a single axis of vibration which corresponds to the motion allowed by the leaf springs. The sensor provides a resolution to almost a millionth of an inch. Other types of sensors may also be used to detect imbalance, such as accelerometers, laser Doppler based sensors, displacement sensors and others as will be apparent to one skilled in the art.

The base casting 32 of the disk drive 33 supports a motor and hub assembly with suitable electrical contacts mating corresponding contacts in the flex deck, which are then routed to a controller 44 via bus 46. A disk stack 47 for a disk drive is rotated by the spindle motor located either below the disk stack or concentric thereto under control of the controller. Such motor and hub combinations, as well as other combinations of motors and hubs are well known in the art. The disk stack is initially lightly coupled to the hub which is located within equal sized central circular openings in the disks and spacers via a clamp 50. The controller 44 causes the motor to rotate the hub and disk stack at about ½ normal operating speed, and the transducer provides the electrical signal on line 48 representative of vibrations caused by imbalance of the motor, hub and disk stack. Other rotational speeds will also be apparent to those skilled in the art. The controller 44 then directs the solenoid 14 to apply a sufficient momentum transferring force via the hammer 15 to the base to cause the disk stack to shift as a unit relative to the base in a manner designed to reduce the imbalance and hence the vibrations. The magnitude of the momentum transferring force is sufficient to subject the base casting to an acceleration in the range of approximately 50 to 150 Gs, transferring sufficient momentum to the base casting to cause the disk stack to shift relative to the base casting. Multiple instances of momentum transferring force are applied at selected times until the vibrations are within a predetermined value. The disk pack is then fixedly coupled to the hub. In an alternate embodiment, the momentum transferring force is directly controllable by an operator, and selected based on the sensed magnitude of imbalance and a desired shift.

In one embodiment, the transducer 41 comprises a Balmac (Hilliard Ohio, USA) Vibration Analyzer Model 216-D which provides an analog voltage signal of up to 600 millivolts on line 48 representative of the displacement caused by the imbalance. In addition, the zero crossings of a further voltage signal provided by the transducer 41 represent the position of maximum imbalance and are used to generate the timing signals to correlate the solenoid actuations. In a further embodiment, such timing signals are obtained from a further sensor placed to detect the timing of the hammer striking the base casting.

In one embodiment of the invention, the disk pack is placed over the hub and lightly coupled thereto by the clamp 50. The clamp is tightened just enough to permit movement of the disk stack with sufficient momentum transferring force applied to the base. The clamping force is highly dependent on the mass of the disk stack and its reaction to displacement force from the hammer. A single disk must be clamped lightly because it has very little mass. A larger stack of disks can be tightened to about ½ the final desired force due to its larger mass and hence larger momentum to overcome the clamping force. It is desirable to have as large a clamping force as feasible to prevent disks from shifting during final tightening steps.

Based on the analog sinusoidal feedback signal provided on line 48 from the transducer indicative of magnitude of displacement and timing of the displacement while the disk stack is rotated at approximately 3000 rpm, the controller causes the solenoid hammer to repeatably strike the base with sufficient momentum transferring force to shift the disk stack relative to the hub and to bias the stack against one side of the hub. The momentum transferring force is varied to impart an acceleration of between approximately 50 to 150 Gs to the base. This causes acceleration of the base casting and not the stack to cause a shift of the stack to register all parts of the stack against the hub. This results in all the disks and spacers in the disk stack having substantially concentric center openings of substantially equal inner diameter. Following this inner diameter registration the base is repeatably struck as a function of measured vibration and rotational delay substantially opposite the center of rotating mass to shift the stack into a position which minimizes rotational vibration. The clamp is then tightened to prevent further shifting of the stack.

The amount of Gs which can be applied to the base is limited on the high end by that which might cause damage to bearings. About ½ the force which might cause bearing damage is set as the upper limit. The lower limit is a function of mass and clamping force, and should be the lowest amount calculated to still cause a shift of the disk stack relative to the hub. While 50 to 150 Gs is used in one embodiment, it may vary significantly with other devices.

The speed at which the disk stack is rotated is also quite variable. While 3000 rpm is used, it is desirable to keep it just above the fundamental frequency of vibration of the disk drive to optimize the movement caused by imbalance so that it can be more easily sensed. This frequency will also likely vary from device to device. For timing accuracy, the rotation speed should be kept as low as possible, but still far enough above the fundamental frequency to avoid runaway vibrations.

Figure 2:
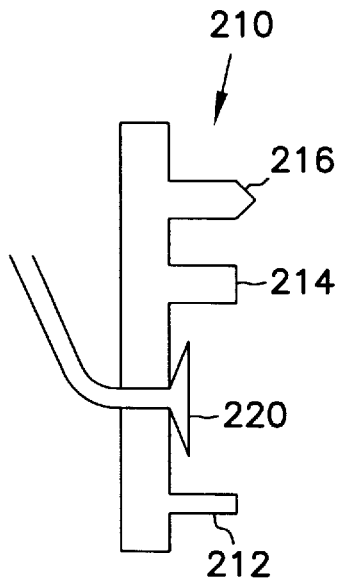
FIG. 2 is a front elevation view of a stabilizer used in conjunction with the fixture of FIG. 1.

In a further embodiment of the invention, a hinged cover plate 70 (not shown precisely to scale) is provided to shield an operator and also provide registration surfaces for a hub stabilizer shown generally at 210 in FIG. 2. The cover plate is formed of a clear poly and comprises a first opening 71 spaced from the hinges to provide access to the clamp from above. The cover plate is supported by a second mass 73 disposed adjacent the sensor to allow the cover plate to be moved down on top of the fixture substantially horizontally and is long enough to be held in place by two further suitably plumbed suction cups 72 disposed in mass 12 and coupled to pump 39.

The stabilizer 210 comprises an elongate bar of lightweight material having a first extension 212 for mating with a second opening 72 in cover plate 70 which will be located over the base casting where hammer 15 contacts it when in closed position. A guide 214 is formed with a registration projection to fit within the first opening 71 and accurately position a hub stabilizer projection 216 in a center depression 80 of the hub with first extension 212 fitting in hole 74. A suction cup 220 coupled to the vacuum pump 39 holds the stabilizer in place to stabilize the hub while the base casting is being struck by the hammer.

Figure 3:
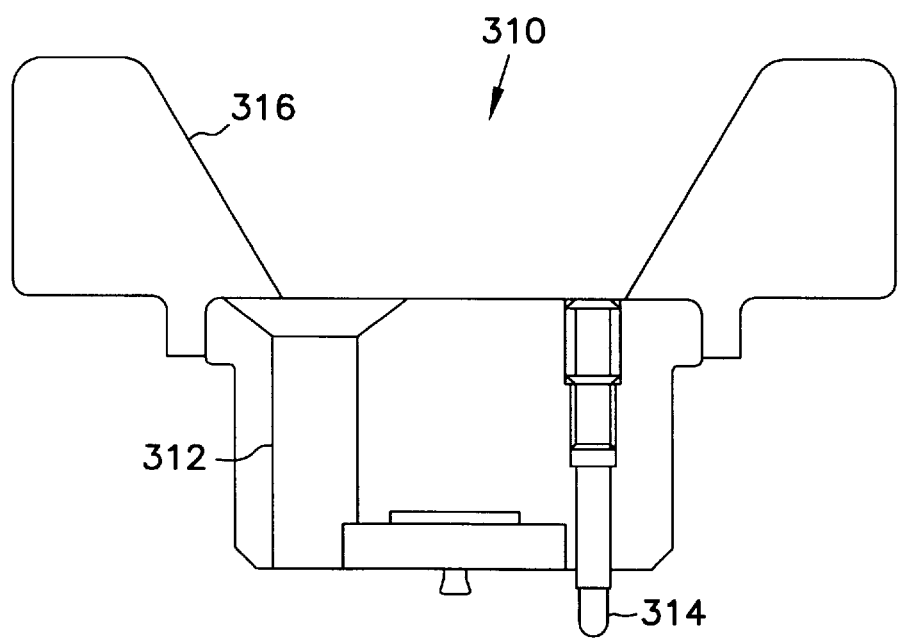
FIG. 3 is a front cross section view of an antirotation guide for use in conjunction with the fixture of FIG. 1.

Referring back to FIG. 1, the clamp comprises four equidistantly dispersed screw holes 82 near its outer diameter, with a registration hole 84 between each screw hole. The screw holes are aligned with corresponding suitably threaded holes in the hub. Screws are used to obtaining the light coupling and then further tightened to fully clamp the disk stack to the hub and motor. A guide indicated generally at 310 in FIG. 3 is placed in the opening 71 in the cover plate 70 to correctly align and hold the clamp for tightening of the screws. The guide 310 is formed in a shape to fit securely in the opening 71, and has holes 312 formed therethrough corresponding to each screw hole, and at least two dogs 314 formed therein for mating with two of the registration holes 84 in the clamp and corresponding tooling holes in the motor beneath the clamp to properly align the holes with the screws and to prevent rotation of the clamp and motor when rotating the screws. Projections 316 permit easy handling and placement by an operator.

Controller 44 in one embodiment comprises standard personal computer components including standard circuitry provided with the sensor and coupled to receive and convert to digital format, signals from the sensor 41 and an operator switch (not shown), and provide control signals to the vacuum pump 39, the solenoid 14 and the spindle motor of the disk drive 33. Controller 44 also comprises programmable logic controller (PLC) circuitry for simultaneous sensing parameters via sensors and processing of selected variables. It is well understood by those skilled in the art that the functions performed by controller 44 may be performed by many different types of circuitry. Through a program written under an application called Lab View from National Instruments running under Microsoft Windows, the following flow diagram of FIGS. 4A, 4B, 4C and 4D is implemented. Note that operator interaction with the program and system 10 are included in the flow diagram as will be readily apparent to one skilled in the art.

Following start 420, the operator places the base casting in the flex deck at 422 and closes the cover at 424 and installs the stabilizer. Then, upon activating a palm switch at 426, the PLC turns on the vacuum and starts the disk drive motor at 428. The PLC then turns control over to the personal computer 430 which starts control of the system at 432. A vacuum sensor may be coupled to the PLC to provide an indication of whether a vacuum is present in order to continue. An imbalance subroutine is then branched to at 440 to bias the disk stack by creating an imbalance to align all the disks and spacers against the hub as previously described. The resulting imbalance desired is approximately 1 gm-mm but preferably greater than 0.8 gm-mm. It is created in approximately 4 seconds in this embodiment which is further described in FIG. 4C. At block 442 a balance subroutine (FIG. 4D) is branched to to balance the disk stack. Following the balancing routine a signal is sent to the PLC indicating that all is done at 444. The PLC then turns off the disk drive motor at 446 and releases the vacuum to the stabilizer at 448. The operator then removes the stabilizer at 450, tightens the screws to ½ torque using the four bit driver at 452 and then finishes applying torque with a manual driver at 454 to tighten the screws to secure the clamp. To ensure that a proper balance was obtained, the operator replaces the stabilizer at 456 and activates the palm switch at 458. The PLC then spins up the motor at 460 for a final balance check. The operator will then record the balance and activate the palm switch again at 462, causing the PLC to stop the motor and release the cover to complete the balancing operation at 464.

Figure 4A:
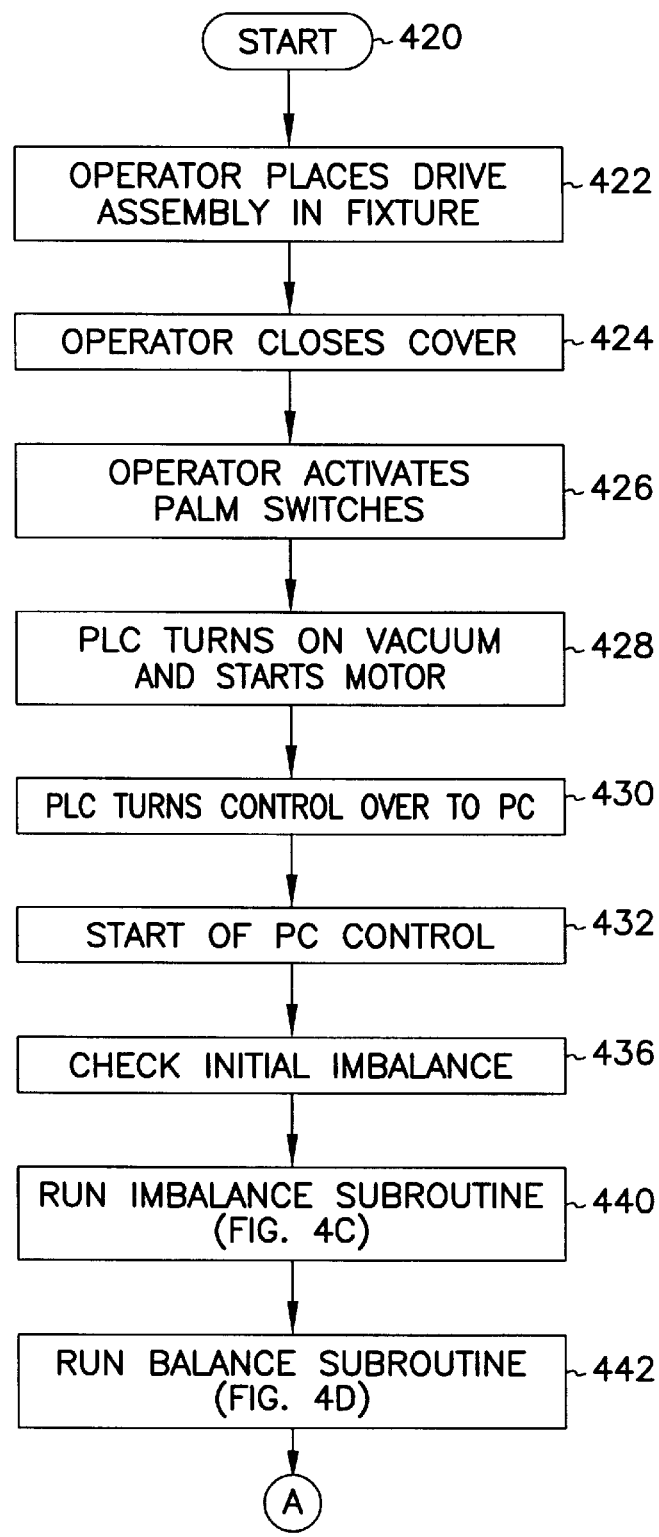
FIGS. 4A, 4B, 4C and 4D are flowcharts describing a registration and centering process and calculation of force to be applied to center the disk stack of FIG. 1.
Figure 4B:
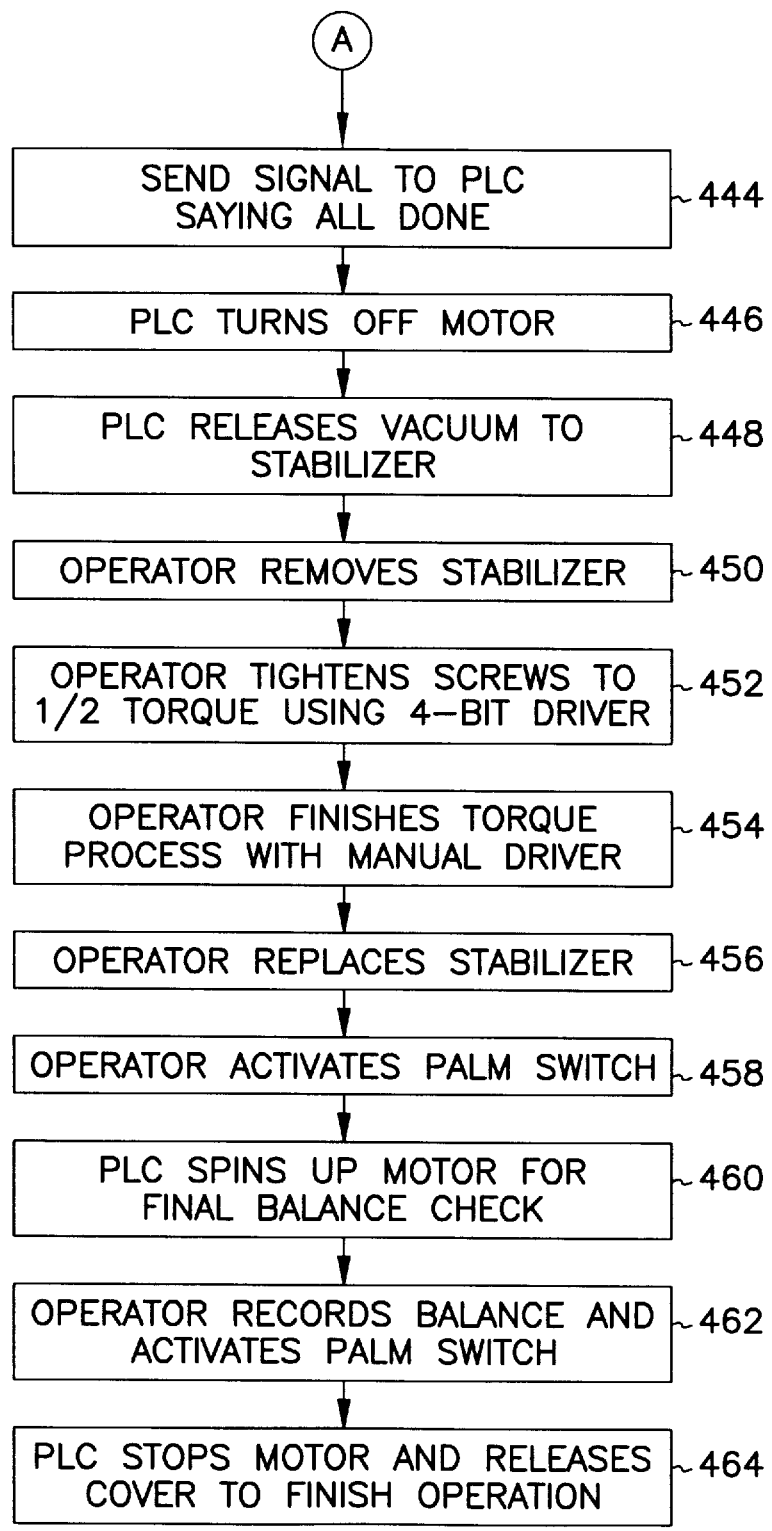
Figure 4C:
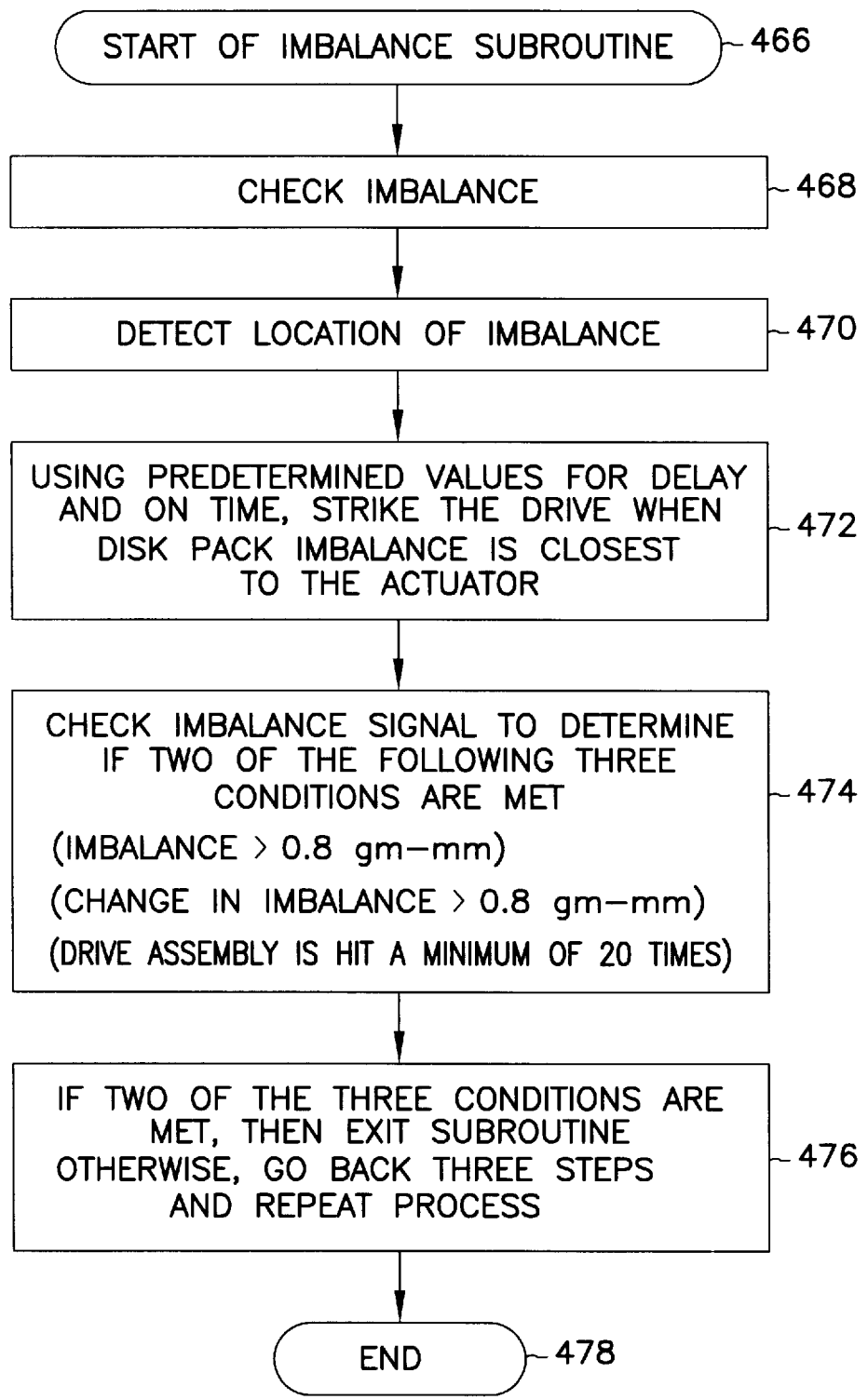

In the imbalance subroutine of FIG. 4C, which is entered at start 466, the current imbalance is detected or checked at 468, the location of the imbalance is detected at 470. Using predetermined values for delay based on the rotational velocity of the disks, hammer flight time, and difference in angles between the sensor and the solenoid, the base is struck with maximum momentum transferring force when the disk stack imbalance is calculated to be closest to the solenoid at 472. At 474, the imbalance signal is used to determine if any two of three conditions are met. The first two conditions are that the imbalance is greater than 0.8 gm-mm or if the change in imbalance was greater than 0.8 gm-mm. The third condition is that the drive assembly has been hit a minimum of 20 times. These values may of course be varied depending on the characteristics of the drive being balanced. If two of the three conditions are met at 476, the subroutine is exited at 478. If not, the steps are repeated starting at the detection of the location of imbalance at 470.

Figure 4D:
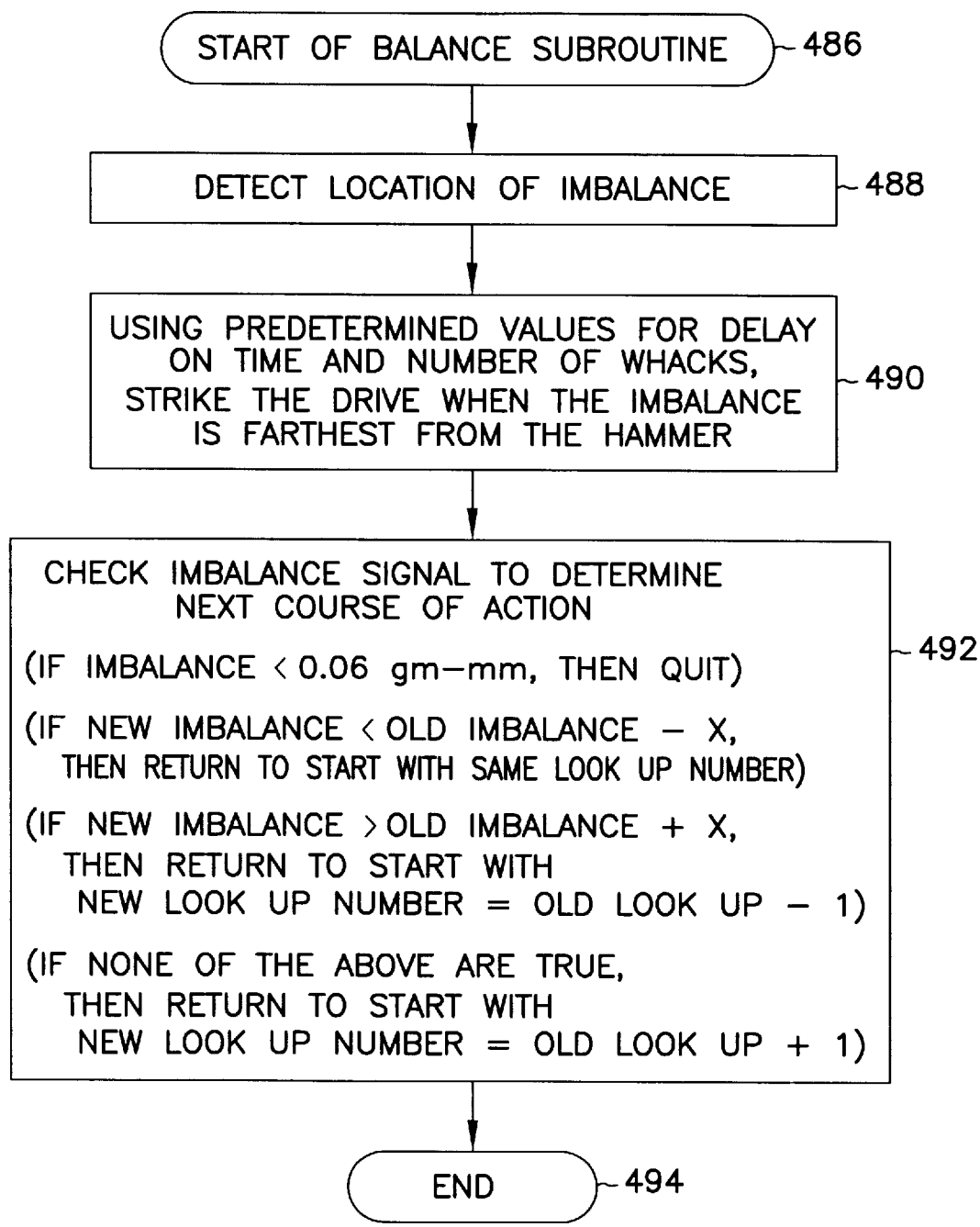

If two of the three conditions are met, the balance subroutine of FIG. 4D is entered at start block 486. The location of the imbalance is first detected at 488. Then, at 490, using predetermined values for delay, on time of the solenoid to drive the hammer, and number of strikes or whacks, the drive is struck by the hammer when the imbalance is farthest from the hammer. The predetermined values are stored in logical rows in a look up file. The on time values comprise a delay for turning on power to the solenoid to drive the hammer and how long to leave the power on. It is directly related to the momentum transferring force generated by the hammer which is calculated to provide selected G's on the order of 150, 125, 100, 75, 50 and 25. Each row of the look up file also indicates which edge to trigger off of from the velocity sensor signals, the number of whacks or strikes to provide when multiple whacks are to be performed, how long to delay between the multiple whacks, and how long to delay before reading the resulting imbalance at 492. Multiple whacks are initially used to retrieve the disk stack from the bias position. The actual values stored in the look up table are calculated based on simple experimentation. The values may vary significantly depending on the drive to be balanced.

If the resulting imbalance is less than 0.06 gm-mm, then the subroutine is ended at 494 and the drive is considered balanced. If the new imbalance is less than the old imbalance minus a constant, then this subroutine is started again with the same row of predetermined values. If the new imbalance is greater than the old imbalance plus a further constant which may be different if desired, then this subroutine is started again with values stored in a previous row of the look up table, which provides a smaller momentum transferring force. If none of the above are true, then the subroutine is started again with values stored in the next row of the look up table to obtain larger shifts of the disk stack. In this manner, decreasing momentum transferring forces are applied, and with repetitive strikes, the disk drive becomes balanced within the desired tolerance. Following full clamping of the disks, the resulting imbalance has been found to be in the range of 0.2 to near zero gm mm for one drive, which is an improvement over various prior methods on the order of a factor of 2 to 5 depending on the size of the drive.

The on time value is a function of detected hitting by the hammer, speed of rotation and detected imbalance in the disk drive. It may be varied between hits if measurements provided by either a sensor designed to detect the impact of the hammer or by measuring the change in phase of the imbalance following striking of the base. It is desirable to ensure that the striking is performed at the correct phase of the imbalance to provide optimal balancing.

Figure 5:
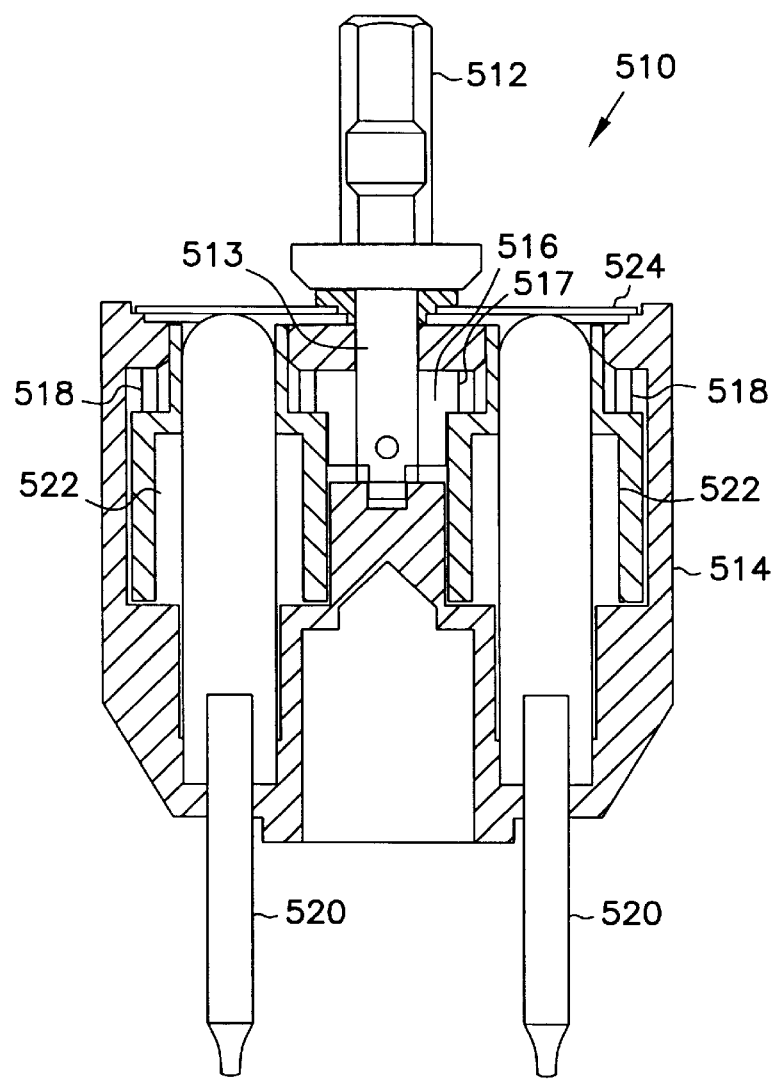
FIG. 5 is a cut away side view of a uniform rotation multi bit driver.

In one embodiment, a multi bit driver as shown generally at 510 in FIG. 5 is used to simultaneously rotate the screws through an equal angle of rotation. A hexagonal chuck 512 having a shaft 513 rotatably disposed at one end of a plastic body 514, which may be formed of the same type of material as the flex deck or any other suitable material. The chuck 512 ends in a central pinion 516 located inside of body 514. Central pinion 516 has a set of annular gears 517 suitably mating a plurality of pinion gears 518 for rotation thereof. Each pinion gear 518 is further coupled to a driver bit 520 via a power takeoff in the form of a roller clutch 522. The driver bits 520 are spring loaded in the roller clutches 522 by means of a leaf spring 524 contacting rounded ends of the driver bits to provide. It should be noted that the rounded ends of the driver bits may freely rotate on the leaf springs with minimal friction regardless of the force exerted by the leaf spring 524. The force exerted is just sufficient to allow the bits to seat properly within screw heads without undue particle generation prior to seating. The roller clutches 522 ensure that each driver bit 520 turns with the pinion gears 518 in a direction which tightens the screws, usually clockwise. The roller clutches 522 also allow counterclockwise rotation until the bits engage with heads of the screws in the hub, and thereafter the bits slip in the clutches so as not to disturb the initial engaged screw positions.

Using the multi bit driver 510, a torque wrench is coupled via chuck 512. The bits are first rotated counterclockwise to engage them with the already lightly torqued screws. A clockwise rotation is then applied with a torque setting of approximately 4 inch-lbs. This setting will vary with different types of screws and drives in various embodiments. The assembly of gears ensures that each screw is driven through the same angle or rotation simultaneously to a given displacement and corresponding axial force. Since all screws started from the same plane, have the same thread pitch and are driven through the same angle of rotation against an element of common spring rate, the axial clamping force applied by each screw is essentially the same by definition regardless of the torque required to drive it. This reduces the potential radial shift which might be caused by trying to turn each screw with equal torque at the same time or in sequence. The torque required to drive each screw may not be directly related to the axial retentive force generated by the screw due to rotational frictional variations which may be caused by different oxidation of threaded portions or surface abnormalities. Only a single pass is required to secure the clamp to the hub, greatly reducing assembly time over methods requiring multiple passes. In addition, complex machinery and torque measurement devices may be replaced by a simple hand or automatically driven torque wrench.

In a further embodiment, when the multi bit driver 510 is inserted through the guide, the bits 520 are rotated counterclockwise to a first end stop position. The first end stop position is calculated to ensure that the bits engage with the screws. The bits are then rotated clockwise to drive the screws simultaneously to a second end stop. At this point, the screws have started from the same plane, are driven through the same angle of rotation and thus provide the same amount of axial retentive force. In both embodiments, the axial force applied by the screw for each instant of time during rotation of the screws is substantially equal such that radial shift is minimized at all times during tightening of the screws.

The disk stack is provided with an initial light clamping prior to the centering operation. A much lighter torque is required to permit the disk stack to shift when the base casting is subjected to impact from the solenoid hammer. It is however desirable to apply as much torque to the disk stack as possible while still permitting the shift to occur to prevent shift during further tightening steps. The larger the mass of the disk stack, the greater the momentum it has, and the more likely it is to shift when the base is subjected to a force designed to transfer momentum to the base. Ranges of torque that have been used vary from ¹⁄₂₀th the final torque to ½ the final torque for such larger mass disk stacks. The multi bit driver is then used again, first to engage the screws equally as described above, then to rotate the screws clockwise following the conclusion of the balancing step to a desired torque and axial retentive force.

In further embodiments of balancing the disk drive, alternative clamping methods may be used to provide the initial light clamping of the disks. In one such embodiment, a weighted cap may be used during centering to hold the disks in place, and then removed to allow for the use of a common heat shrink clamp. Other methods of lightly and then permanently clamping the disk stack will be apparent to those skilled in the art. In further embodiments, no light clamping is used, and the disk stack is centered and then retentively clamped.

Figure 6:
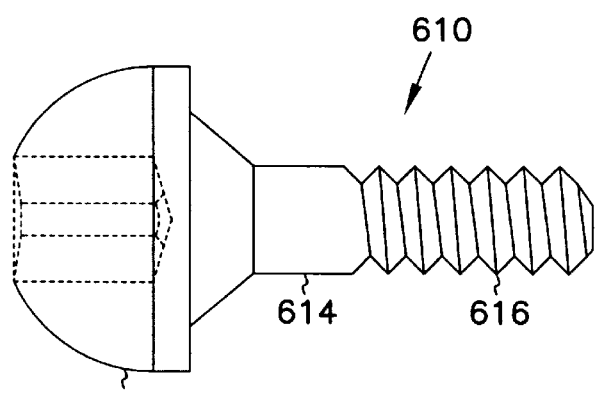
FIG. 6 is a side elevation view of a screw formed from a memory material.

While standard stainless steel screws, such as National Course (NC) 2-56 button headed cap screws having 56 threads per inch are used in the above embodiments, the tightening of them to fixedly secure the disk stack does have the potential of generating unwanted particles, since there are metal parts which rub each other during initial engagement of the bits with the screw heads and during rotation of the screws. In a further embodiment, screws formed of a memory alloy are used as shown generally at 610 in one example in FIG. 6. The memory alloy in one embodiment is Flexinol™ provided by Dynalog. Nickel-Titanium alloys are generally used to form memory alloys as is commonly known. Memory alloys have the characteristic that they may be pulled in a cool state, and remain elongated. When heated to a transformation temperature, the crystalline structure changes from face cubic to body cubic, causing the alloy to shrink back to its original state, changing volume in a single dimension.

Screw 610 comprises a head 612 having a shank 614 which is unthreaded, and corresponds to at least the height of the clamp 50 through which it will pass through to the hub, where a threaded portion 616 of the screw 610 will be engaged with a suitably mating threaded portion to a desired light torque. In one embodiment, axially prestretched screws 610 are tightened via a driver to provide a desired axial force during the balancing of the disk stack. It may also be used with other balancing methods.

Once ready for fixed attachment of the disk stack, each screw is substantially simultaneously, or as otherwise desired, heated to its transformation temperature as by heated contact elements or lasers focussed on each head 612 causing the screw to shrink in the axial direction and provide desired axial retentive force. If heated substantially simultaneously, the same benefits are obtained as described above with respect to simultaneous tightening of normal screws. In addition, since little if any force by a hard material such as a bit is applied to the screw, there is less chance of particle generation.

The transformation temperature is much higher than that of the normal operating temperature of the disk drive, and can provide a shrinkage of up to approximately 7% if desired depending on how far the screw was stretched.

In one embodiment, rod stock memory alloy of sufficient diameter (0.160 inches for example) to machine a number 2 screw is first axially stretched approximately 5% in length. Approximately 300 pounds of force is required to stretch a 0.160 inch diameter of alloy. The actual length it is stretched and diameter of the resulting screw will be a function of the desired axial retentive force which is sufficient to prevent movement of the disk stack during operation, but not so much as to undesirably warp the disk stack. The force required to stretch the alloy, and hence the maximum clamping force it can provide at normal disk drive operating temperatures is a function of the diameter of the screw. The screw is then machined in a common manner to have approximately the same thread pitch crest and root as a standard screw previously used. When the screw is then heated following installation in the clamp and hub, it contracts or shrinks along its entire axial length to about a 4% stretched state. This results in the thread pitch increasing to about 59 threads per inch. In addition to providing a desired axial retentive force, a self locking thread pitch is also provided. In other words, the threads tend to squeeze against the matingly threaded portion of the hub, thus locking the screw in place. In a further embodiment, only the shaft of the screw is stretched following machining of the screw from alloy stock. This resulting stretched screw also has the same dimensions as that of a standard screw. When heated to the transformation temperature, the shaft will shrink a desired amount. Less heat needs to be provided as by silver tipped contact heating elements or other heating elements including radiation type heating devices such as lasers, and the screw may be removed for rework much more easily than the self locking version of the screw.

It is to be understood that the above description is intended to be illustrative, and not restrictive. While described chiefly with respect to a disk drive embodiment, it is apparent to those skilled in the art that the method of shifting mass by subjecting an object to a momentum transferring force in a desired manner is useful in many other fields to balance rotating masses. In addition, other devices may benefit from the provision of equal simultaneous rotation provided to a plurality of fasteners. In addition, the heat shrink screws may also be used in different embodiments outside the area of disk drives. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of centering a disk pack in a disk drive device having a base rotatably supporting the disk pack, the method comprising:

rotating the disk pack; and while the disk pack is rotating:

sensing imbalance in the rotating disk pack to produce a time-varying signal; and responsive to the time-varying signal, transferring sufficient momentum to the base to cause a relative shift between the base and the disk pack to balance the disk pack.

2. The method of claim 1 and further comprising the steps of:

sensing an imbalance within a desired value; and clamping the disk pack to prevent further movement of the disk pack.

3. The method of claim 1 wherein the steps of sensing and transferring are repeated until the imbalance sensed is within a desired range.

4. The method of claim 1 and further comprising the step of determining a delay time to delay the transferring step a desired delay time following the sensing of the imbalance such that the transferring step is performed when the imbalance is approximately 180 degrees opposite the point at which momentum to the base is provided.

5. The method of claim 4 and further comprising the step of adjusting the desired delay time based on further sensing of the imbalance.

6. A method of centering a disk pack in a disk drive device having a base rotatably supporting the disk pack, the method comprising:

a) rotating the disk pack; and b) while the disk pack is rotating:

b1) sensing imbalance in the rotating disk pack;

b2) repeatably transferring sufficient momentum to the base to cause a relative shift between the base and the disk pack to equally bias each element of the disk pack based upon continued imbalance sensing; and b3) after step b2), repeatably transferring sufficient momentum to the base opposite the sensed imbalance to shift the base relative to the disk pack wherein the sensed imbalance is less than a predetermined amount.

7. A method of balancing a mass rotatably supported by a motor fixed on a base, the method comprising:

rotating the mass; and while the mass is rotating:

sensing imbalance in the rotating mass to produce a time-varying signal; and responsive to the time-varying signal, transferring sufficient momentum to the base to cause a relative shift between the base and the mass to balance the mass.

8. The method of claim 7 wherein the mass comprises a plurality of independent stacked objects rotating in unison.

* * * * *